United States Patent Office 2,900,619
Patented Aug. 18, 1959

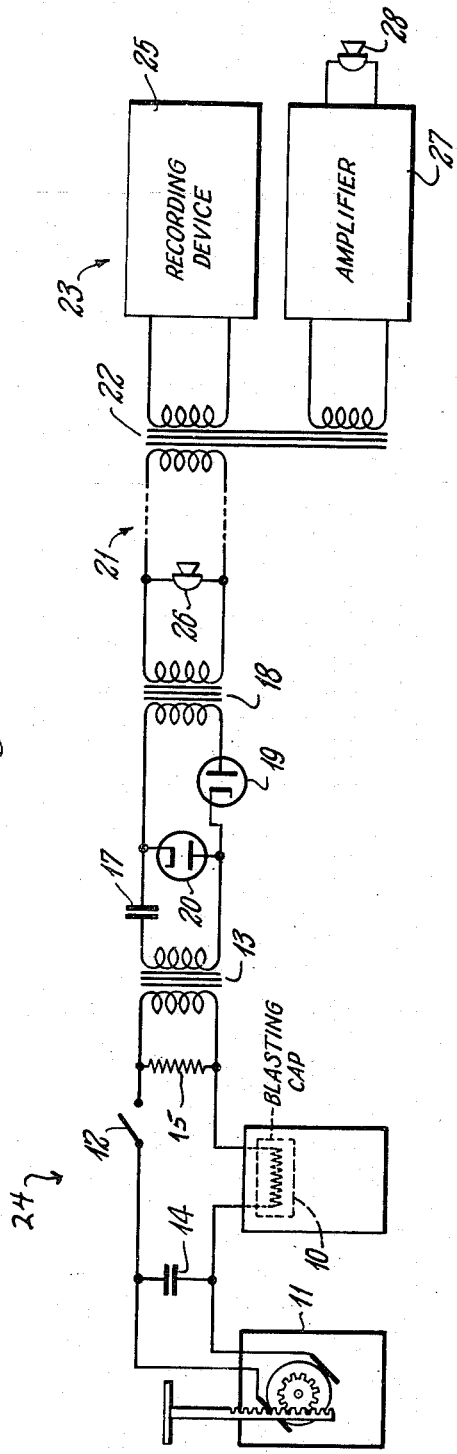
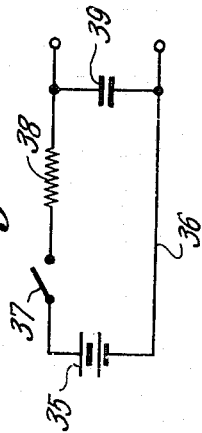

2,900,619

SYSTEM FOR RECORDING TIME

Orin C. Montgomery, Bartlesville, Okla., assignor to Phillips Petroleum Company, a corporation of Delaware Application July 12, 1954, Serial No. 442,743

7 Claims. (Cl. 340—15)

This invention relates to seismic prospecting. In another aspect, it relates to a system for recording the time of occurrence of detonation of an explosive charge.

In seismic prospecting, an explosive charge is detonated in the earth at a location referred to as the "shot point." A series of seismometers are planted in the earth at locations remote from the shot point and, when the charge is detonated, a portion of the energy of the explosion is reflected or refracted from the subterranean formations to the seismometers. The interval of time required for the waves to traverse the distance between the shot point and the formations of interest together with the interval required for the reflected waves to reach the seismometers yields valuable and important information regarding the geological strata. In order that these intervals can be properly measured, it is evident that the time of the explosion or detonation must be accurately recorded to serve as a reference time. Otherwise the interval required for the waves to traverse their subterranean path is not accurately measured.

Heretofore, various systems have been devised to electrically detonate a blasting cap which, in turn, causes the charge to fire, the electrical impulses produced by detonation of the cap being transmitted to a recording station and appearing on the recording medium.

It is a primary object of the present invention to provide an improved system of this character to the end that little or no current is wasted in auxiliary components of the firing circuit, and in which there is no necessity of balancing the circuit prior to each shot.

Another object is to provide a system where the pulse sent from the firing station to the recording station is of sufficient duration that it can be readily handled by the recording instrument.

Still another object is to provide a system whose performance is substantially independent of the inductance and/or capacitance of the lines transmitting the firing signals from the shot point to the recording station.

Still another object is to provide a circuit of simple construction, which utilizes a minimum of standard circuit components, and which is substantially independent of the amount of current produced by the firing generator.

Various other objects, advantages and features of the invention will become apparent from the following detailed description taken in conjunction with the accompanying drawings, in which:

Figure 1 is a schematic circuit diagram of a time break recording system constructed in accordance with the invention;

Figures 2a, 2b, and 2c are graphs illustrating wave forms at various parts of the circuit of Figure 1; and Figure 3 is a schematic circuit diagram showing a modification of the invention.

In accordance with the invention, I provide an energy storage device, such as a condenser, which is charged during the application of firing current to the blasting cap. This device is connected in circuit with a rectifier which prevents passage of the charging current through the transmission line to the recording station. The circuit is so arranged that, when the cap fires, the flow of current to the energy storage device is interrupted whereupon the condenser discharges through the rectifier and transmission line to produce a time break signal at the recording station which is accurately representative of the time of firing the shot. Also associated with the energy storage device is a second rectifier which permits the charging current to flow into the storage device and charge it but which does not permit the storage device to discharge through it.

Referring now to Figure 1, I have shown an electric blasting cap 10 which is connected in series with a generator 11, a switch 12, and the primary winding of a transformer 13. A condenser 14 is connected in parallel with the generator 11 and a resistance 15 is connected in parallel with the primary winding of the transformer 13. A secondary winding of the transformer 13 is connected in series with an energy storage device, such as a condenser 17, the primary winding of a transformer 18 and a rectifier 19. A rectifier 20 is connected between the terminal of condenser 17 remote from transformer 13 and the other or free terminal of the secondary winding of this transformer. The secondary winding of transformer 18 is connected by a transmission line 21 to the primary winding of a transformer 22 which is located at a recording station 23 remote from the station 24 where the blasting cap and its associated circuit are disposed. The transformer 22 has a secondary winding which is connected to a recording device 25.

As an optional feature, a telephone 26 can be connected across the transmission line 21 at the station 24, and the transformer 22 at recording station 23 can be provided with an additional secondary winding connected through an amplifier 27 to a telephone 28, whereby telephonic connections can be maintained between the shot point and the recording station.

In operation, switch 12 is closed and blasting cap 10 is arranged to fire a charge of explosive material which is usually placed in a shot hole drilled in the earth. When it is desired to fire the shot, generator 11 is actuated, and current flows through the blasting cap and primary winding of transformer 13 until the charge is fired. Thereupon, the firing circuit is broken at the blasting cap 10 so that the current flows in the described circuit, as represented by the rectangular wave 30, Figure 2a.

The described flow of current in the firing circuit causes energy storage device 17 to charge through rectifier 20, it being understood that the rectifier 20 is of proper polarity to permit the flow of this charging current. Rectifier 19, however, is so poled as to prevent the flow of current through the primary winding of transformer 18. Thus, prior to detonation of the explosive, device 17 is charged as indicated by the left-hand half 31a of the voltage wave shown by Figure 2b, and no current flows through transformer 18, the transmission line 21 and the recording device, as indicated by the left-hand portion 32a of the voltage wave illustrated in Figure 2c. When the blasting cap is disintegrated and charging current ceases to flow, device 17 discharges through the primary winding of transformer 18 and rectifier 19, the discharge of the condenser being indicated by the right-hand portion 31b of the voltage wave illustrated in Figure 2b. It will be noted that no current flows through rectifier 20 during this period.

The discharge of energy storage device 17 produces a wave in the transmission line 21 and at the recording device 25 as indicated by the right-hand portion 32b of the wave form illustrated in Figure 2c, thereby giving a sharp and accurate signal coincident in time with the detonation of the charge.

It will be noted that no balancing or adjustment of the circuit is required between the firing of successive shots, and only a very few standard circuit components are utilized in the firing circuit. Further, the duration of the pulse 32b produced at the recording device is regulated by the capacity of energy storage device 17 and does not directly depend upon the magnitude or duration of the firing current. As a result, the amplitude of the time break signal is independent, or substantially so, of the output of the generator, and the pulse 32b is sufficiently long and therefore has such frequency characteristics that the galvanometer or other recording device can properly respond to it. Also, the effect of the inductive or capacitative reactance of the transmission line is greatly minimized. It will be apparent, therefore, that I have achieved the object of my invention in providing an improved circuit for recording a time break or other occurrence.

In the circuit illustrated, condenser 14 is a conventional unit connected in parallel with the firing generator and can have a value of 20 microfarads. Resistance 15 has a low ohmic value of about 0.1 to 0.5 ohm, as compared with a total resistance of 3 to 5 ohms for the firing circuit, so as to prevent slow build-up of current across the primary winding of transformer 13 which might contribute to erratic firing of the charge. Energy storage device 17 can advantageously have a value of 40 microfarads where the remainder of the circuit has the characteristics already described.

In Figure 3, I have shown an alternative circuit where a battery is utilized instead of a generator to supply the firing current. In this modification, the generator 11 and condenser 14 are replaced by a battery 35 having a lead 36 connected to one terminal thereof and a switch 37 in series with a fixed resistance 38 connected to the other terminal thereof, a condenser 39 being connected between lead 36 and the terminal of resistance 38 remote from switch 37. Condenser 39 has a value of about 40 microfarads and resistance 38 has a value of 100,000 ohms. In this instance, the battery and its associated circuitry are substituted for the generator 11 and condenser 14, the firing of the charge being effected by closure of switch 37. The operation of the modified circuit is otherwise similar to that of Figure 1.

While the invention has been described in connection with a present, preferred embodiment thereof, it is to be understood that this description is illustrative only and is not intended to limit the invention.

I claim:

1. In a system for recording a time break, in combination, an energy storage condenser, a first rectifier connected in series therewith, a firing circuit including a blasting cap and a source of current for firing said blasting cap connected in series, means for feeding the output of said firing circuit to the series combination of condenser and rectifier, said rectifier being so poled as to permit said condenser to charge responsive to flow of current in said firing circuit, a recording device, a second rectifier connected to said condenser, means for coupling said condenser to said recording device through said second rectifier, said second rectifier being so poled as to prevent flow of charging current therethrough, whereby firing of said blasting cap interrupts the flow of current through said firing circuit, thereby permitting said storage device to discharge and provide a signal at said recording device.

2. A system in accordance with claim 1 in which the current source is a blasting current generator.

3. A system in accordance with claim 1 in which the current source is a battery having a fixed resistance connected to one terminal thereof and a condenser connecting the other terminal of said battery to the end of said fixed resistance remote from said battery.

4. In a system for recording a time break, in combination, first and second transformers each having a primary and a secondary winding, an energy storage condenser connecting one terminal of the secondary winding of said first transformer to one terminal of the primary winding of said second transformer, a first rectifier connecting the other terminal of the secondary winding of said first transformer to the other terminal of the primary winding of said second transformer, a second rectifier device connecting said other terminal of the secondary winding of said first transformer with said one terminal of the primary winding of said second transformer, a resistance of low ohmic value connected in parallel with the primary winding of said first transformer, a firing circuit including a current source and a blasting cap connected in series with the primary winding of said first transformer, a recording device, and a transmission line coupling the secondary winding of said second transformer with said recording device, said first rectifier being poled so as to permit discharge current to flow from said condenser through the primary winding of said second transformer, and said first rectifier being so poled as to permit charging current to flow into said condenser from said first transformer.

5. A system in accordance with claim 4 in which the current source is a blasting current generator having a condenser connected in parallel therewith.

6. A system in accordance with claim 4 in which the said current source is a battery having a fixed resistance connected to one terminal thereof and a condenser connecting the other terminal of said battery to the end of said series resistance remote from said battery.

7. In a system for recording the time of occurrence of an event, in combination, a condenser, a rectifier, a direct current charging source connected in series with said condenser and said rectifier, said rectifier being poled to allow current from said source to charge said condenser, means for energizing said source, a second rectifier, a recording circuit connected in series with said condenser and said second rectifier, the latter rectifier being poled to allow a voltage pulse resulting from discharge of said condenser to pass into said recording circuit, and means for interrupting the flow of said current, thus allowing the condenser to discharge and produce said voltage pulse.

References Cited in the file of this patent

UNITED STATES PATENTS

| | | |
|---|---|---|
| 2,275,316 | Ritamann | Mar. 3, 1942 |
| 2,369,082 | Shook | Feb. 6, 1945 |
| 2,435,903 | Ritzman | Feb. 10, 1948 |
| 2,547,890 | Rubin | Apr. 3, 1951 |
| 2,597,013 | Marchetti | May 20, 1952 |
| 2,745,052 | Willemse | May 8, 1956 |